(12) United States Patent
Ouchi

(10) Patent No.: US 6,603,578 B2
(45) Date of Patent: *Aug. 5, 2003

(54) COMMUNICATIONS TERMINAL EQUIPMENT

(75) Inventor: Tetsuya Ouchi, Tajimi (JP)

(73) Assignee: Brother Kogyo Kabushiki Kaisha, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,324

(22) Filed: Dec. 7, 1998

(65) Prior Publication Data

US 2002/0176119 A1 Nov. 28, 2002

(30) Foreign Application Priority Data

Sep. 12, 1997 (JP) ............................................. 9-339017

(51) Int. Cl.[7] ................................................. H04N 1/00
(52) U.S. Cl. ......................... 358/440; 468/405; 468/400
(58) Field of Search ................................. 358/400, 500, 358/468, 434, 444, 404, 440, 405, 436–438

(56) References Cited

U.S. PATENT DOCUMENTS

| 4,937,857 | A | * | 6/1990 | Yamashita | ................. 379/210 |
|---|---|---|---|---|---|
| 5,432,616 | A | * | 7/1995 | Fukao | ......................... 358/434 |
| 5,638,055 | A | * | 6/1997 | McDonald | ............... 340/825.5 |
| 5,727,050 | A | * | 3/1998 | Mori | ...................... 379/100.09 |
| 5,838,662 | A | * | 11/1998 | Miyamoto | .................. 370/230 |
| 5,901,218 | A | * | 5/1999 | Kato | ........................... 379/373 |
| 6,064,725 | A | * | 5/2000 | Nakanishi | .................... 379/140 |
| 6,310,699 | B1 | * | 10/2001 | Kawasaki | .................... 358/434 |
| 6,323,962 | B1 | * | 11/2001 | Itoh | ........................... 358/468 |

FOREIGN PATENT DOCUMENTS

| JP | A-62-216584 | | 9/1987 | ............ H04N/1/32 |
|---|---|---|---|---|
| JP | 2-312351 | * | 12/1990 | ............ H04N/1/00 |
| JP | U-5-39072 | | 5/1993 | ............ H04N/1/00 |
| JP | 07236046 | * | 9/1995 | ............ H04N/1/32 |
| JP | A-9-284423 | | 10/1997 | ............ H04N/1/00 |
| JP | 409261430 A | * | 10/1997 | ............ H04N/1/32 |
| JP | 411308389 A | * | 11/1999 | ............ H04N/1/00 |

* cited by examiner

Primary Examiner—Jerome Grant, II
(74) Attorney, Agent, or Firm—Oliff & Berridge PLC

(57) ABSTRACT

Whether or not a calling signal is inputted to NCU 2 during facsimile communication is first monitored (S1). If no calling signal is detected (S1:NO), a subroutine processing for a display processing is executed (S2). If a calling signal is detected (S1:YES), a subroutine processing for the ID receiving processing is executed (S3). If the facsimile communication is terminated (S4:YES), a subroutine processing for the processing of displaying the received ID (S5), a subroutine processing for a printing processing (S6), and a subroutine processing for a redial processing (S7) are sequentially executed. The processing from S1 is then repeated (S9).

19 Claims, 9 Drawing Sheets

COMMUNICATIONS TERMINAL EQUIPMENT

BACKGROUND OF THE INVENTION

1. Field of the Invention

The present invention relates to communications terminal equipment having a facsimile function, and more particularly to communications terminal equipment capable of detecting caller identification information based on input information input through a communication line during fax communication and allowing an information device to inform a user of the caller identification information after the facsimile communication, whereby to allow the user to surely know the caller originating the input information.

2. Description of Related Art

Heretofore, there has been known communications terminal equipment with a telephone function, a facsimile function or the like. In such the communications terminal equipment, a telephone communication can be made by the function of a telephone set, while a facsimile communication can be made by the facsimile function whereby to transmit/receive image data, text data, and so on.

However, even if the conventional communications terminal equipment receives a call signal input through a communication line during the execution of the facsimile function, this equipment can not switch the line connection to the caller originating the call signal. The equipment also can not allow a user to know whether or not the call signal is received and the caller information. Accordingly, the user can not take an appropriate action.

SUMMARY OF THE INVENTION

The present invention has been made in view of the above circumstances and has an object to overcome the above problems and to provide communications terminal equipment which detects and stores caller identification information input through a communication line during the execution of a facsimile function, displays or prints out the caller identification information after the completion of the facsimile function, whereby to allow a user to surely know the information of a caller signal received during the facsimile function, i.e., a caller telephone number and a caller name corresponding to this telephone number, etc.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided communications terminal equipment including a facsimile function, a detection device for detecting caller identification information included in a caller ID received through a communication circuit during execution of the facsimile function, an identification information memory for storing the identification information detected by the detection device, and an information device for informing of the identification information stored in the identification information memory.

In the communications terminal equipment mentioned above, when the identification information is detected from the caller ID received through the communication circuit during executing the facsimile function. The identification information is stored in the identification information memory. The stored identification information is then informed.

Accordingly, a user can surely know the caller identification information included in the caller ID received during the execution of the facsimile function. When the above equipment receives a call signal during the facsimile function, even if an instant response to the call can be made, the caller originating the call signal can be specified in accordance with the identification information to take an appropriate action after completion of the facsimile function.

According to another aspect of the present invention, there is provided a facsimile device including a detection device for detecting caller identification information included in a caller ID received through a communication circuit during facsimile communication, an identification information memory for storing the identification information detected by the detection device; and an information device for informing of the identification information stored in the identification information memory.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
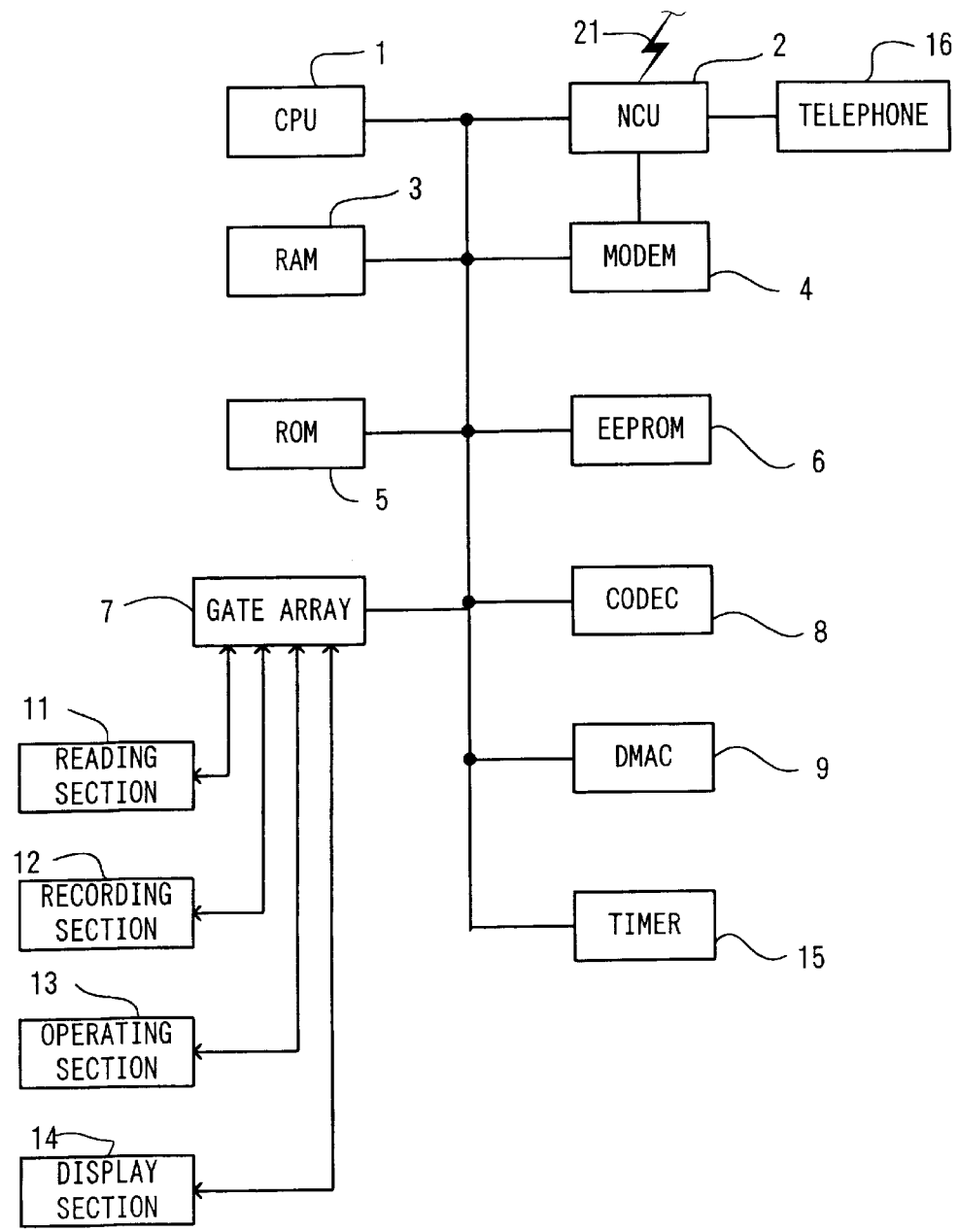
FIG. 1 is a circuit block diagram of a main part of a facsimile device in an embodiment according to the present invention.
Figure 2:
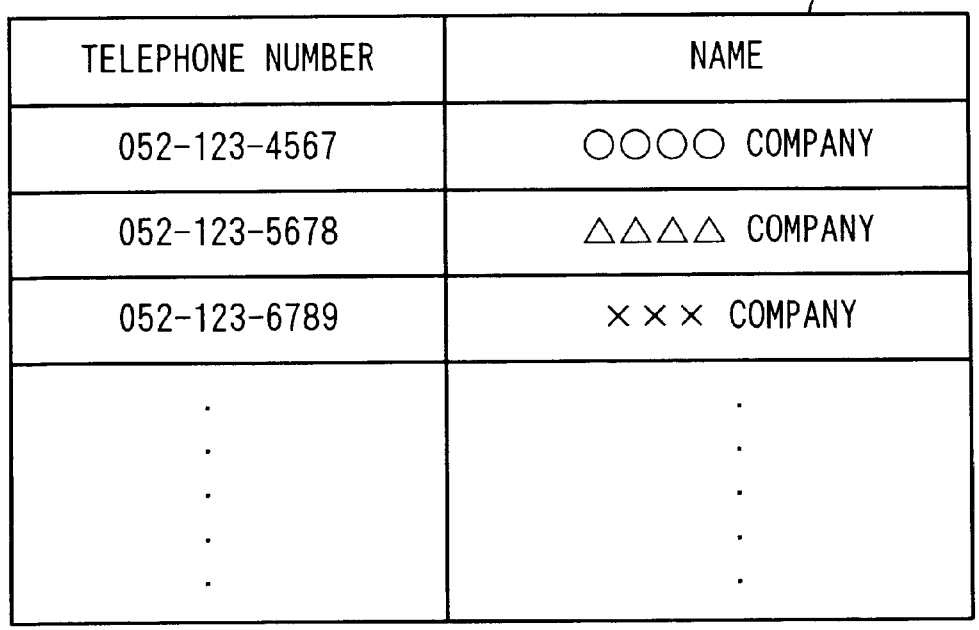
FIG. 2 is an example of an ID table in the embodiment.

A detailed description of one preferred embodiment of a facsimile device embodying communications terminal equipment according to the present invention will now be given referring to the accompanying drawings. First, the schematic construction of the facsimile device in the present embodiment will be described with reference to FIGS. 1 and 2. FIG. 1 is a circuit block diagram of a main part of the facsimile device in the embodiment. FIG. 2 is an example of an ID table in the embodiment.

In FIG. 1, the facsimile device has a circuit schematically including CPU 1, NCU 2, RAM 3, a modem 4, ROM 5, EEPROM 6, a gate array 7, a codec 8, DMAC 9, a reading section 11, a recording section 12, an operating section 13, a display section 14, a timer 15, and a telephone set 16 and others. These CPU 1, NCU 2, RAM 3, modem 4, ROM 5, EEPROM 6, gate array 7, codec 8, DMAC 9, and timer 15 are connected to on another through bus lines. Connected to the gate array 7 are the reading section 11, the recording section 12, the operating section 13, and the display section 14. Also, the modem 4, the telephone set 6, and the telephone circuit 21 are connected to the NCU 12.

CPU 1 controls the whole facsimile device. NCU 2 is connected to the telephone circuit 21 so as to control a network. RAM 3 stores various digital data such as image information. The modem 4 modulates transmitted data, demodulates received data, and so on. ROM 5 stores various programs, data or the like necessary for executing a facsimile function or the like. EEPROM 6 stores various entry data, flags or the like. This entry data includes caller identification information, i.e., a telephone, number and a caller name corresponding to this telephone number, etc. These are stored in the EEPROM 6 in the form of an ID table 17 (see FIG. 2). The gate array 7 functions as an I/O interface, of the CPU 1. The codec 8 decodes the received image data demodulated by the modem 4. Also, the codec 8 encodes the transmitted image data, transmits the encoded data to the modem 4 and allows the modem 4 to modulate the transmitted data. DMAC 9 controls an access to a memory such as the RAM 3. The reading section 11 includes a light source, a CCD sensor, an original paper feeding motor, or the like. The reading section 11 reads the original paper and outputs an image signal. The recording section 12 comprises a heat transfer printer, a laser printer or the like. The recording section 12 records an image on a recording paper in accordance with the image data. The operating section 13 comprises a key switch group or the like. The operating section 13 outputs an operation signal in response to a user's operation The display section 14 comprises LCD or the like. The display section 14 constitutes a display device for providing various displays under the control of the CPU 1. The timer 15 has a clock function. The timer 15 outputs date information, time information or the like to the CPU 1 or the like. Furthermore, the telephone 16 constitutes a call device for communicating with the device to be called.

Here, the CPU 1 constitutes a detection device for detecting the caller identification information included in a caller ID inputted through the telephone circuit 21 in a processing described below. The RAM 3 constitutes an identification information memory for storing the caller identification information detected from the caller ID received through the telephone circuit 21. The EEPROM 6 constitutes a caller information memory for storing the previously entered ID table 17. As shown in FIG. 2, the caller identification information, i.e., the caller telephone number and the caller name corresponding to this identification information are previously entered in the ID table 17. That is, the following correspondence between the telephone number and the name is stored in the ID table 17. Namely, the caller name corresponding to the telephone number "052-123-4567" is "○○○○ Company". The caller name corresponding to the telephone number "052-123-5678" is "△△△△ Company". The caller name corresponding to the telephone number "052-123-6789", is "XXXX Company". Also, the CPU 1 constitutes a second judgement device for determining whether or not the identification information detected by the detection device is stored in the ID table 17 in the processing described below. Moreover, the CPU 1 constitutes a receipt time detecting device for detecting the time when the caller identification information is detected in accordance with the time information or the like from the timer 15 constituting a clock device in the processing described below; and a time measuring device for measuring the elapsed time since this detection.

The recording section 12 serving as an information device constitutes printing device. The display section 14 constitutes a display device.

The operating section 13 is provided with a print start key and a print stop key, a redial section key as an identification information selection device, a selection key, a redial start key, a stop key, and other keys thereon.

Next, the procedure of the receiving processing at the receipt of the caller ID during facsimile communication of the thus constituted facsimile device will be described with reference to FIGS. 3 through 9. It should be noted that the caller ID is inserted in a static period of a calling signal and this caller ID includes the telephone number as the caller identification information.

Figure 3:
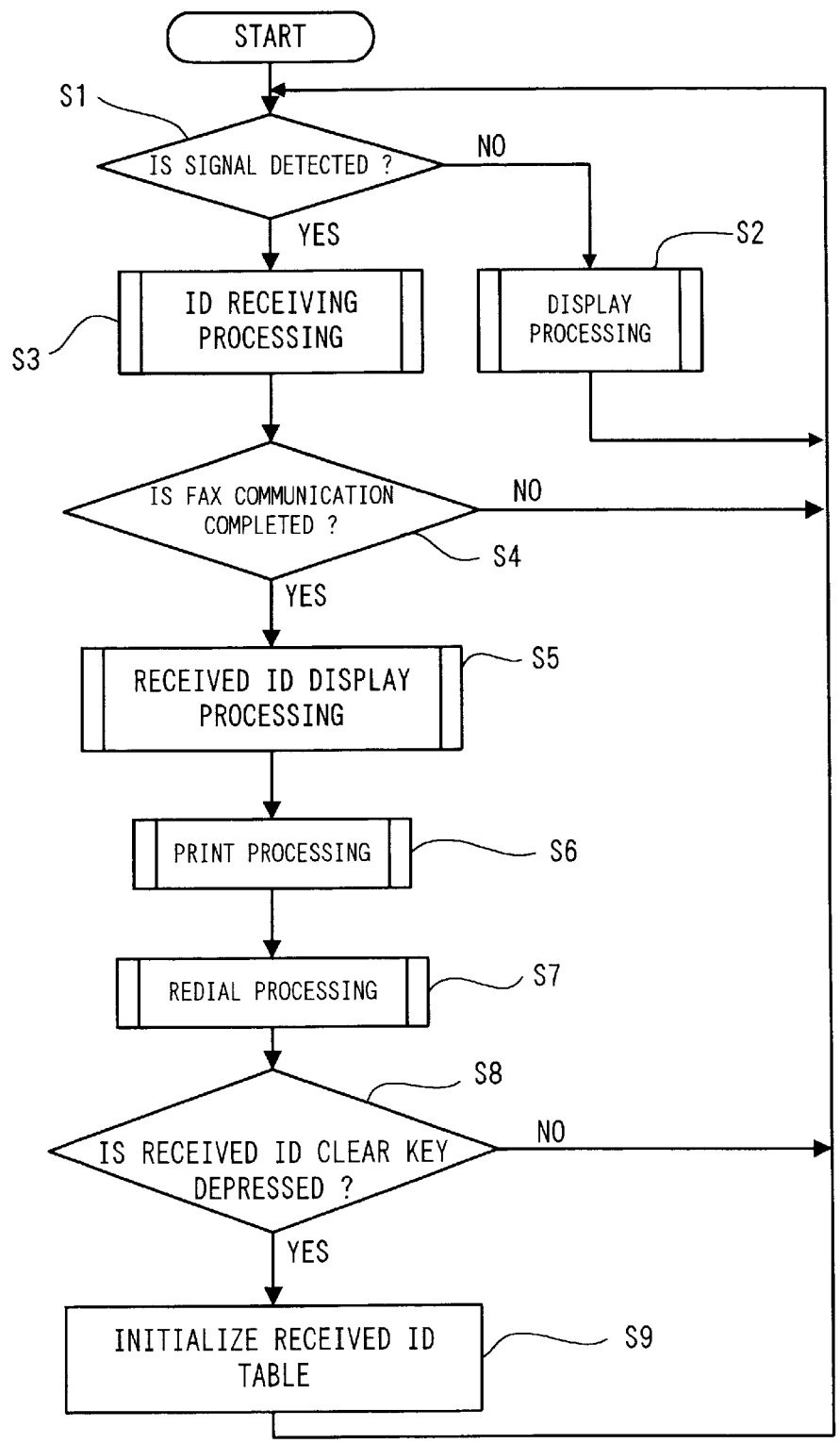
FIG. 3 is a main flowchart for a caller ID receiving processing to be executed at the receipt of a caller ID during facsimile communication of the facsimile device.
Figure 4:
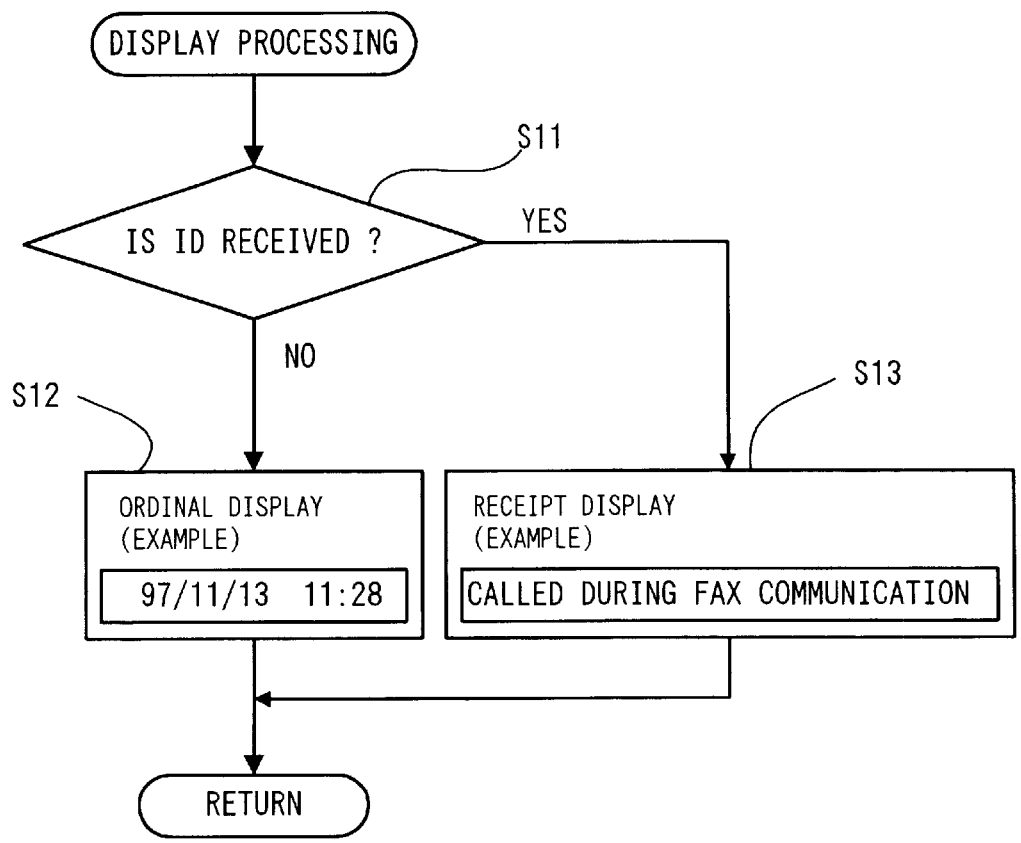
FIG. 4 is a sub-flowchart for a display processing during facsimile communication in the caller ID receiving processing in the embodiment.
Figure 5:
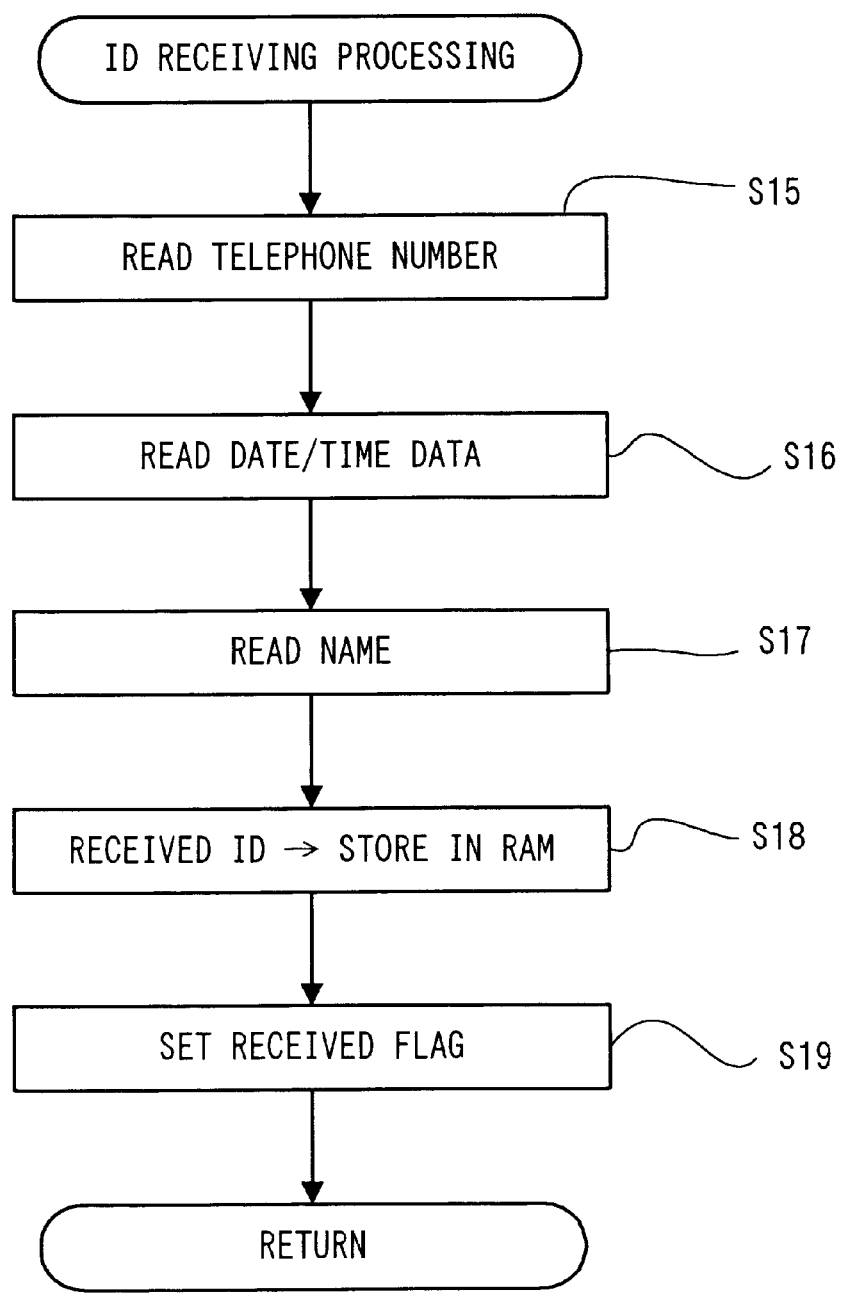
FIG. 5 is a sub-flowchart for an ID receiving processing in the caller ID receiving processing in the embodiment.
Figure 6:
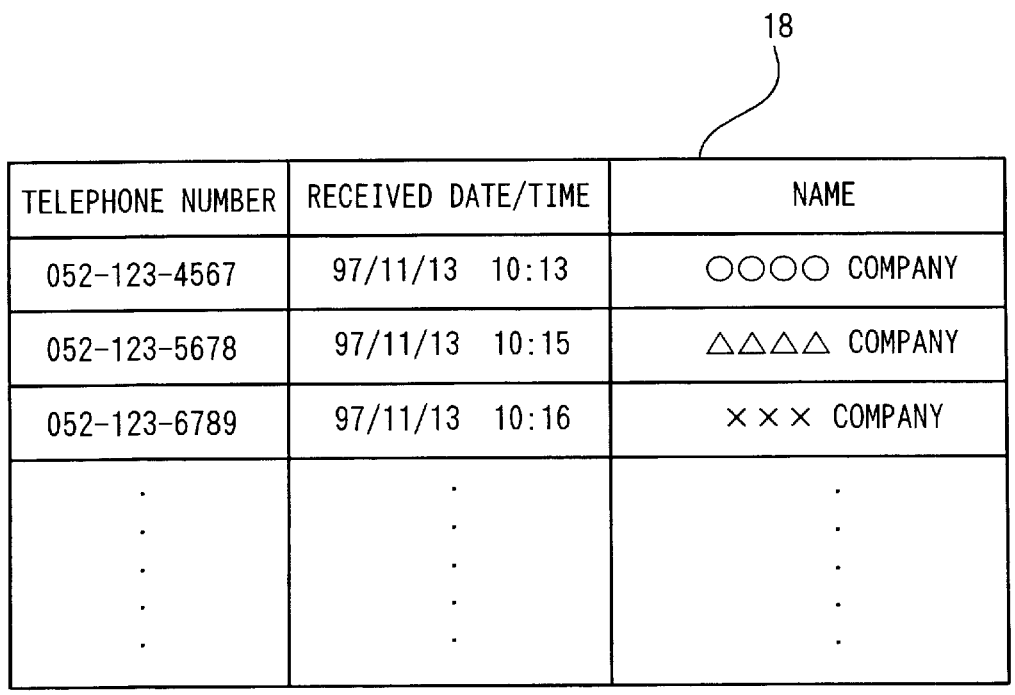
FIG. 6 is an example of a received ID table stored in RAM in the ID receiving processing.
Figure 7:
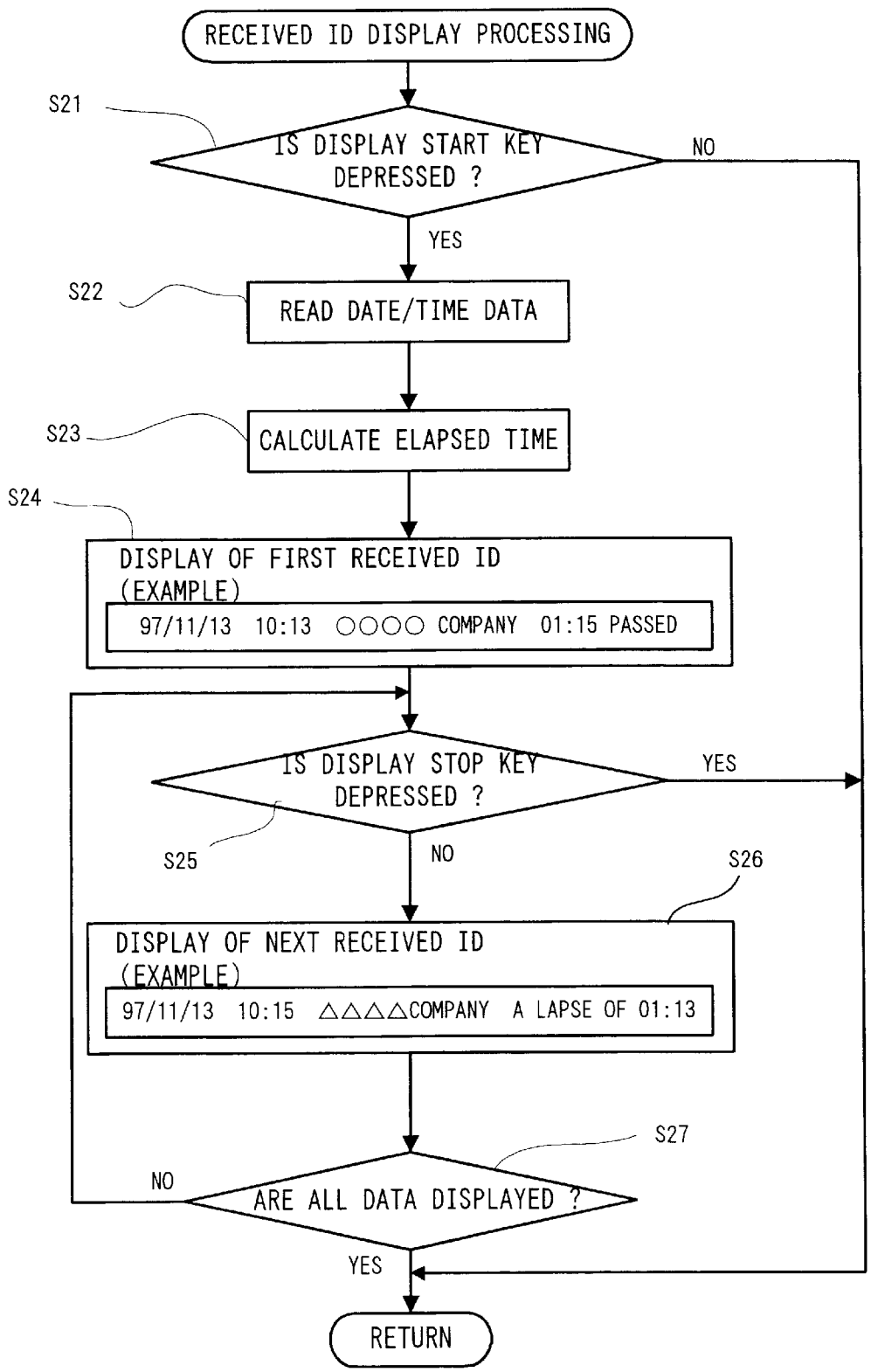
FIG. 7 is a sub-flowchart for received ID display processing in the caller ID receiving processing in the embodiment.
Figure 8:
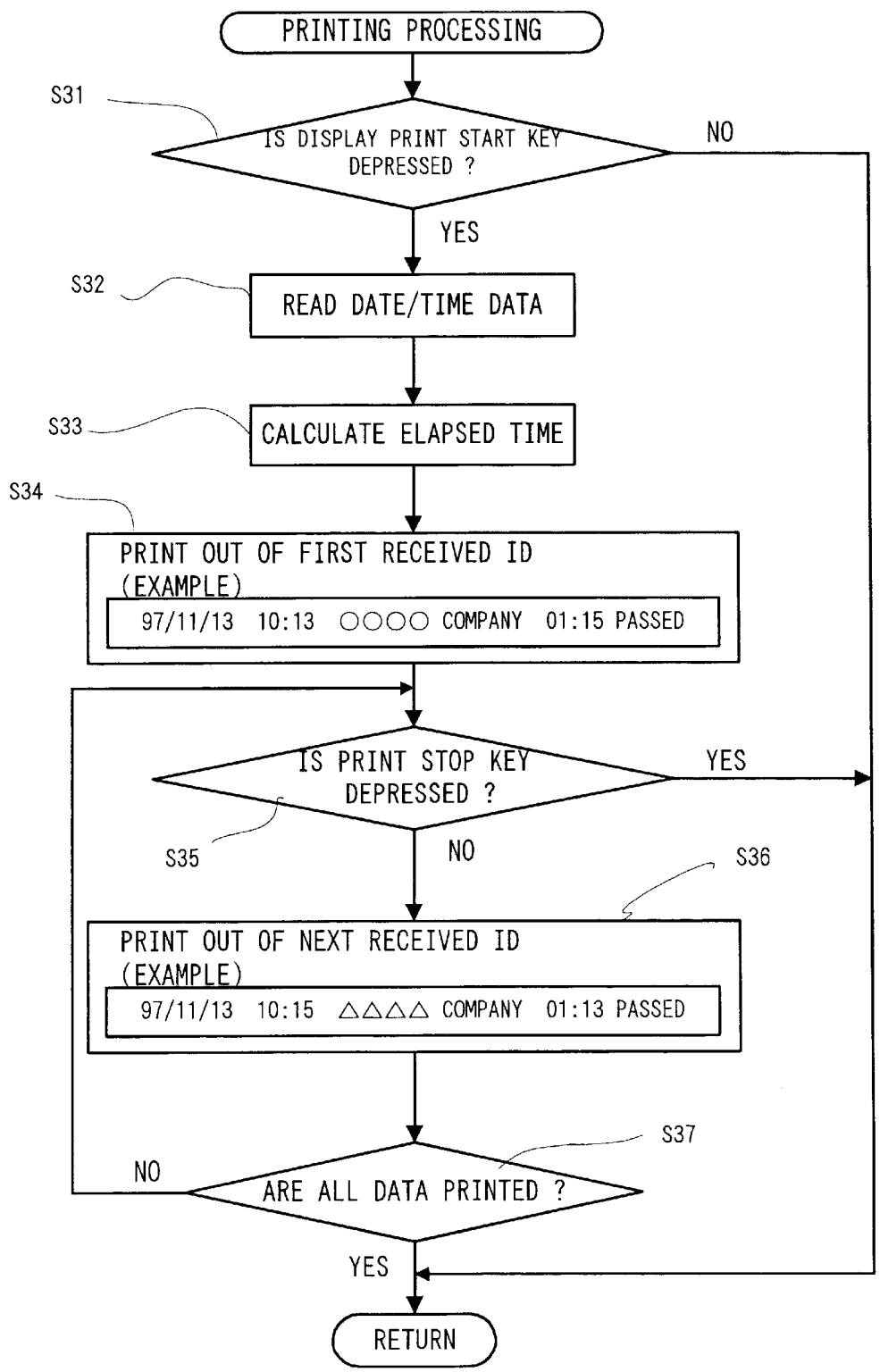
FIG. 8 is a sub-flowchart for print processing in the caller ID reception processing.
Figure 9:
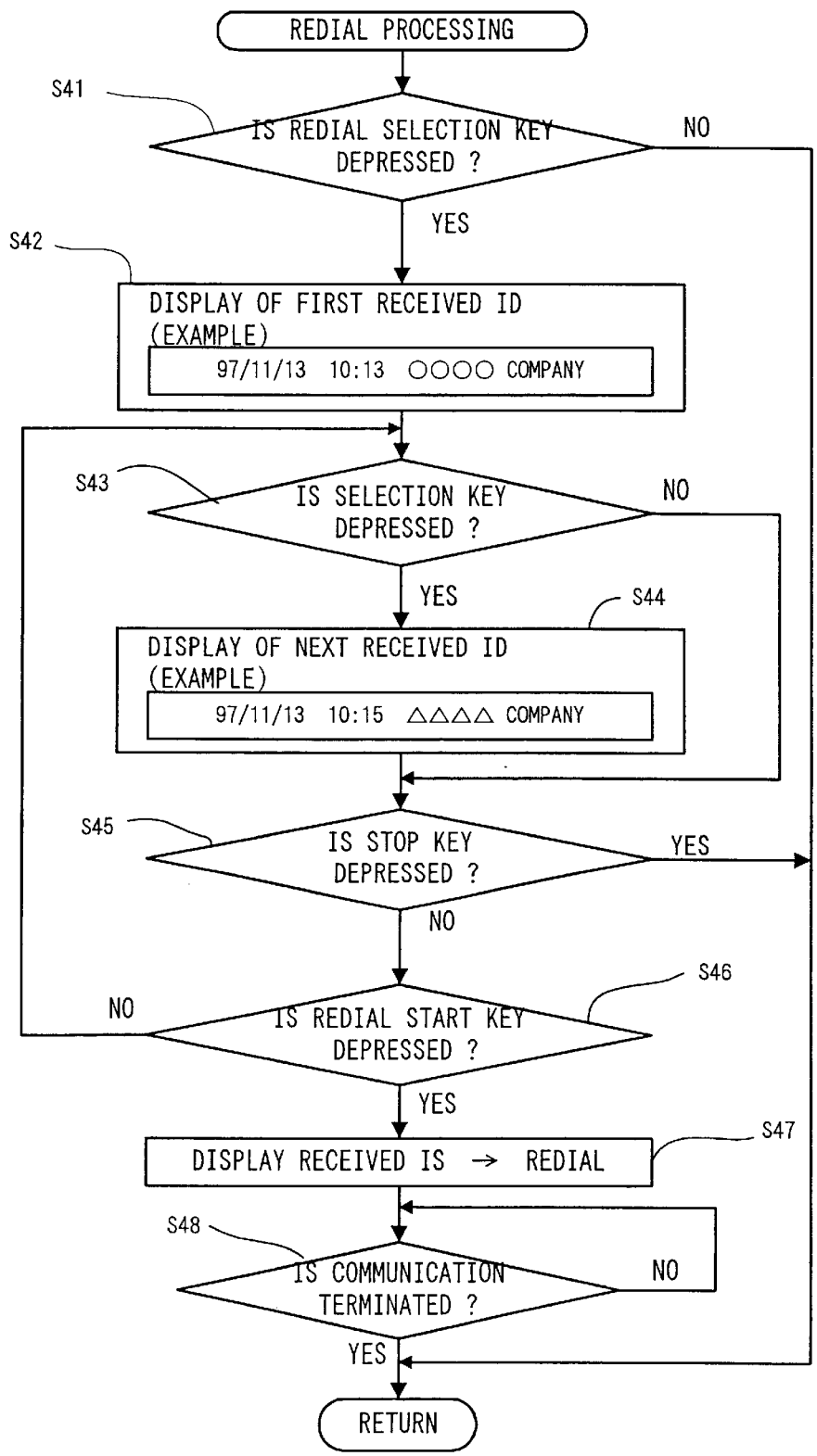
FIG. 9 is a sub-flowchart for redial processing in the caller ID receiving processing.

FIG. 3 is a main flowchart for a caller ID receiving processing to be executed at the receipt of a caller ID during facsimile communication of the facsimile device in the embodiment. FIG. 4 is a sub-flowchart for a display processing during facsimile communication in the caller ID receiving processing in the embodiment. FIG. 5 is a sub-flowchart for an ID receiving processing in the caller ID receiving processing in the embodiment. FIG. 6 is an example of a received ID table stored in RAM in the ID receiving processing. FIG. 7 is a sub-flowchart for received ID display processing in the caller ID receiving processing in the embodiment. FIG. 8 is a sub-flowchart for print processing in the caller ID reception processing. FIG. 9 is a sub-flowchart for redial processing in the caller ID receiving processing.

First, as shown in FIG. 3, in Step (hereinafter abbreviated as S) 1, whether or not the calling signal is inputted to the NCU. 2 during the facsimile communication is monitored (S1). If the calling signal is not detected (S1: NO), a subroutine processing for a display processing is executed (S2).

Next, the subroutine processing for the display processing will be described with reference to FIG. 4. As shown in FIG. 4, in the display processing (S2), a determination is first made as to whether or not a received flag, indicative of whether or not the identification information included in the caller ID is detected, is set (S11). If the received flag read from the EEPROM 6 is not set, that is, if the received ID comprising the caller telephone number or the like as the identification information is not stored in the RAM 3 (S11: NO), the caller ID is not received. Thus, the current date and time outputted as the normal display from the timer 15 is displayed on the display section 14, and then the processing is returned to a main processing (S12) In this embodiment, as an example of the normal display, the current date and time "97/11/13 11:28" is displayed. This indicates "Nov. 13, 1997, AM 11:28" (S12).

If the received flag read from the EEPROM 6 is set (S11: YES), "Called during FAX communication" indicating that the caller ID is received is displayed on the display section 14, and then the processing is returned to the main processing (S13). Thereby, the user can know that his/her device is called from other communications device during the FAX communication and the caller ID is received.

Subsequently, in FIG. 3, if the calling signal is inputted. (S1: YES), the subroutine processing for the ID receiving processing is executed (S3).

Next, the subroutine processing for the ID receiving processing will be described with reference to FIGS. 5 and 6. As: shown in FIG. 5, the telephone number as the caller identification information is first read from the caller ID inserted between the calling signals (S15). Next, date/time data at that time is read from the timer 15 as the receipt date and time (S16). Then, the name corresponding to this caller telephone number is retrieved and read from the ID table 17 (see FIG. 2) (S17) As the result of the retrieval, if the corresponding name is not found, this processing is not performed. Next, the caller telephone number, the receipt date and time and the name are stored in a received ID table 18 (see FIG. 6) stored in the RAM 3 (S18).

Next, the received flag is read from the EEPROM 6, the received flag is set, the received flag is stored again in the EEPROM 6, and then the processing is returned to the main processing (S19).

As shown in FIG. 6, the caller telephone number, the receipt date and time and the name are stored in the received ID table 18 in the order of receipt. In the received ID table 18 shown in FIG. 6 as an example, in the first place, the telephone number "052-123-4567", the receipt date and time "97/11/13 10:13" and the name "○○○○ Company" are stored. This indicates that "the telephone number: 052-123-4567, the receipt date and time: Nov. 13, 1997, AM 10:13, the caller: ○○○○ Company". In the second place, the telephone number "052-123-5678", the receipt date and time "97/11/13 10:15" and the name "△△△△ Company" are stored. Similarly, this indicates that "the telephone number: 052-123-5678, the receipt date and time: Nov. 13, 1997, AM 10:15, the caller: △△△△ Company". In the third place, the telephone number "052-123-6789", the receipt date and time "97/11/13" and the name "XXX Company" are stored. This indicates that "the telephone number: 052-123-6789, the receipt date and time: Nov. 13, 1997, AM 10:16, the caller: XXX Company".

Next, as shown in FIG. 3, whether or not the facsimile communication is terminated is determined (S4). If the facsimile communication is not terminated (S4: NO), the processing is returned to the processing of S1. Whether or not the caller ID is received is determined (S1).

If the facsimile communication is terminated (S4: YES), the subroutine processing for the processing of displaying the received ID is executed (S5).

Next, the subroutine processing for the processing of displaying the received ID will be described with reference to FIG. 7. As shown in FIG. 7, in the processing of displaying the received ID (S5), whether or not a display start key on the operating section 13 is pressed is first determined (S21). If this display start key is not pressed, the processing is returned to the main processing (S21: NO).

If this display start key is pressed (S21: YES), the date/time data at that time is read from the timer 15, and then this date/time data is stored in the RAM 3 as display time data (S22). Next,: the first received ID data is read from the received ID table 18: (see FIG. 6). Then, the receipt date/time data of this received ID data is subtracted from the display time data, thereby calculating the elapsed time since the receipt of the first received ID data (523). Next, the first received ID data and the elapsed time are displayed on the display section 14 through the gate array (S24). As an example of the display, "97/11/13 10:13, ○○○○ Company, 01:15 passed" is displayed. This indicates that "the caller ID is received from ○○○○ Company at AM 10:13 on Nov. 13, 1997 and one hour and fifteen minutes have passed since the receipt".

Then, whether or not a display stop key on the operating section 13 is pressed is determined (S25). If the display stop key is pressed, the processing of displaying the received ID is stopped, and then the processing is returned to the main processing (S25: YES).

If the display stop key is not pressed (S25: NO), the second received ID data is read from the received ID table 18 (see FIG. 6) as the subsequently stored received ID data. The display time data is also read from the RAM 3. Then, the receipt date/time data of this received ID data is subtracted from the display time data, thereby calculating the elapsed time since the receipt of the second received ID data. The second received ID data and the: elapsed time are displayed on the display section 14 through the gate array 7 (S26). As an example of the second display, "97/11/13 10:15, △△△△ Company, 01:13 passed" is displayed. This indicates that "the caller ID is received from △△△△ Company at AM 10:15 on Nov. 13, 1997 and one hour and thirteen minutes have passed since the receipt".

Next, whether or not all the received ID data in the received ID table 18 are displayed is determined (S27). If all the received ID data are not displayed, the processing from S25 is repeated (S27: NO).

If all the received ID data are displayed (527: YES), the processing is returned to the main processing.

Thus, when the calling signal is inputted during executing the facsimile function, the user can know the caller originating the calling signal due to the identification information of the caller ID. The user can also know the elapsed time since the receipt of this caller ID due to the display on the display section 14.

The large-sized display section 14 could be constituted so that all the received ID data may be displayed together at one time. On the other hand, the small-sized display section 14 could be constituted so that the data may be sequentially displayed by switching the displays.

Next, as shown in FIG. 3, a subroutine processing for the printing processing is executed (S6).

This subroutine processing for the printing processing will be described with reference to FIG. 8. As shown in FIG. 8, in the printing processing (S6), a determination is first made as to whether or not a print start key is pressed (S31). If this print start key is not pressed, the processing is returned to the main processing (S31: NO).

If this print start key is pressed (S31: YES), the date/time data at that time is read from the timer 15, and then this date/time data is stored in the RAM 3 as printing start time data (S32). Next, the first received ID data is read from the received ID table 18 (see FIG. 6). Then, the receipt date/time data of this received ID data is subtracted from the printing start time data, thereby calculating the elapsed time since the receipt of the first received ID data (S33). Next, the first received ID data and the elapsed time are printed by the recording section 12 through the gate array (S34). As an example of the print, "97/11/13 10:13, ○○○○ Company, 01:15 passed" is shown. This indicates that "the caller ID is received from ○○○○ Company at AM 10:13 on Nov. 13, 1997 and one hour and fifteen minutes have passed since the receipt".

Then, whether or not a printing stop key on the operating section 13 is pressed is determined (S35). If the printing stop key is pressed, the processing of printing the received ID is stopped, and then the processing is returned to the main processing (S35: YES).

If the printing stop key is not pressed (S35: NO), the second received ID data is read from the received ID table 18 (see FIG. 6) as the subsequently stored received ID data.

The printing start time data is also read from the RAM 3. Then, the receipt date/time data of this received ID data is subtracted from the printing start time data, thereby calculating the elapsed time since the receipt of the second received ID data. The second received ID data and the elapsed time are printed by the recording section 12 through the gate array 7 (S36). As an example of the second print, "97/11/13 10:15, ΔΔΔΔ Company, 01:13 passed" is shown. This indicates that "the caller ID is received from ΔΔΔΔ Company at AM 10:15 on Nov. 13, 1997 and one hour and thirteen minutes have passed since the receipt".

Next, whether or not all the received ID data in the received ID table 18 are printed out is determined (S37). If all the received ID data are not printed out, the processing from S35 is repeated (S37: NO).

If all the received ID data are printed out (S37: YES), the processing is returned to the main processing.

Thus, when the calling signal is inputted during executing the facsimile function, the user can know the caller originating the calling signal due to the identification information of the caller ID. The user can also know the elapsed time since the receipt of this caller ID due to the printing by the recording section 12.

Next, as shown in FIG. 3, a subroutine processing for the redial processing is executed (S7).

This subroutine processing for the redial processing will be described with reference to FIG. 9. As shown in FIG. 9, in the redial processing (S7), whether or not a redial selection key is pressed is first detected (541). If this redial selection key is not pressed, the processing is returned to the main processing (S41: NO).

If this redial selection key is pressed (541: YES), the first received ID data is read from the received ID table 18 (see FIG. 6). Then, the first received ID data is displayed on the display section 14 (S42). As an example of the display, "97/11/13 10:13, ○○○○ Company, 01:15 passed" is shown. This indicates that "the party to be redialed is ○○○○ Company from which the caller ID was received at AM 10:13 on Nov. 13, 1997".

Then, whether or not the selection key on the operating section 13 is pressed is determined (S43). If the selection key is pressed (S43: YES), the second received ID data is read from the received ID table 18 (see FIG. 6) as the subsequently stored received ID data. The, the second received ID data is displayed on the display section 14 (S44). AS an example of the second display, "97/11/13 10:15, ΔΔΔΔ Company, 01:13 passed" is shown. This indicates that "the party to be redialed is ΔΔΔΔ Company from which the caller ID was received at AM 10:15 on Nov. 13, 1997".

If the selection key is not pressed (S43: NO), the display on the display section 14 remains unchanged (S43: NO).

Subsequently, a determination is made as to whether or not the stop key on the operating section 13 is pressed (S45). If the stop key is pressed (S45: YES), the redial processing is stopped and the processing is returned to the main processing.

If the stop key is not pressed (S45: NO), whether or not a redial start key on the operating section 13 is pressed is detected (S46).

If the redial start key is not pressed (S46: NO), the processing from S43 is repeated.

It the redial start key is pressed (S46: YES), the telephone number of the received ID data displayed on the display section 14 is automatically redialed (S47). The processing waits the, termination of the communication with the telephone set 16 (S48: NO), and is returned to the main processing upon the completion of the communication (S48: YES). Thus, the user can confirm the desired caller to redial without fail.

Next, as shown in FIG. 3, a determination is made as to whether or not a received ID clear key on the operating section 13 is pressed (S8). If this clear key is not pressed (S8: NO), the processing from S1 is repeated.

If the clear key is pressed (S8: YES), the received ID table 18 (see FIG. 6) and the received flag are initialized (S9). Then, the processing from S1 is repeated.

As described above in detail, the facsimile device in the present embodiment, the calling signal is inputted from the third party through the telephone circuit 21 during the facsimile communication, the telephone number of the identification information included in the caller ID inserted between the calling signals is detected. The previously entered name corresponding to the telephone number is stored together with the receipt time read from the timer 15 in the received ID table 18 as the received ID data (53) Upon depression of the display start key, the stored received ID data are successively displayed in the order of stored (S5). Upon depression of the printing start key, the stored received ID data are successively printed out in the order of, stored (56). Furthermore, upon depression of the redial selection key, the party to be redialed is displayed in the order of stored, and the desired party is automatically redialed upon depression of the redial start key (S7).

Accordingly, the user can surely know the caller telephone number of the caller ID received during facsimile communication due to the display on the display section 14 and the print printed out by the recording section 12, so that the user can take appropriate receiving action to the specific party. Since the caller name of the caller ID is printed out or displayed, the user can determine the priority of the caller ID received during facsimile communication to take more appropriate receiving action. Moreover, the user can correctly know the receipt date/time of the caller ID at the receipt thereof during the facsimile communication and the elapsed time from the receipt as well as the corresponding caller telephone number. The user can therefore take more proper answering action to the party identified by the telephone number.

The printing of the input data received during facsimile communication, i.e., the received ID data of the caller allows the user to know the number of received input information and the caller telephone number at the sight of the printed data to take prompt action. Additionally, the user can previously confirm all the received ID data on the display section 14, so that only the desired ones of the received ID data can be printed out, whereby to save recording medium, ink ribbon, etc., resulting in the reduction of printing cost.

Furthermore, the caller of the caller ID received during facsimile communication can be optionally selected to be automatically redialed. Thus, the redial can surely be made to: the desired party.

The caller name can previously be entered in EEPROM 6 corresponding to the caller telephone number, making it easy to enter identification information and possible to reduce the volume of memory of the EEPROM 6. The caller identification information stored in the EEPROM 6 can be retrieved by an area code, a local code, or telephone subscriber number, thereby increasing the efficiency of retrieving.

The present invention may be embodied in other specific forms without departing from the spirit or essential characteristics thereof. For instance, the followings may be selected.

(a) The names stored in the ID table 17 are in the font of Japanese Katakana in the above embodiment, but not limited thereto, they may be in the other font of Japanese Kanji or Hiragana.

(b) The received ID data is displayed after the termination of facsimile communication in the above embodiment, and may be displayed during facsimile communication.

(c) In the above embodiment, the caller name of the caller ID, previously entered in the ID table 17, is displayed and printed out. If the caller name has not been entered in advance in the ID table 17, however, the caller telephone number may be displayed and printed out.

(d) All the received ID data are printed out in the above embodiment, but the selection of the received ID data to be printed out may be made.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A communications terminal device capable of conducting communications through a communication circuit, the device comprising:

a facsimile function;

a detection device which detects caller identification information belonging to an external communications terminal device when receiving an incoming call from the external communications terminal device while the communications terminal device is engaged in a previously initiated facsimile function with another external communications terminal device;

an identification information memory for storing identification information detected by the detection device; and an information device for informing a user of the stored identification information.

2. The communications terminal equipment according to the claim 1 further including:

a clock device for clocking date and time; and a receipt date and time detection device for detecting receipt date and time of the caller ID from the clock device and storing the receipt date and time in correspondence with the identification information in the identification information memory;

wherein the information device informs the identification information together with the receipt date and time corresponding to the identification information.

3. The communications terminal equipment according to claim 2 further including:

a time measuring device for measuring an elapsed time from a time when the caller ID is received;

wherein the information device informs the identification information together with the elapsed time from the receipt of the identification information.

4. The communications terminal equipment according to claim 3, wherein the information device includes a display device for displaying the identification information during the execution of the facsimile function or after completion of the facsimile function.

5. The communications terminal equipment according to claim 4 further including:

a first judgement device for determining whether or not the caller ID is received;

wherein when the first judgement device determines that the caller ID is received, during the execution of the facsimile function, the display device displays a message indicating that the caller ID is received during the execution of the facsimile function.

6. The communications terminal equipment according to claim 5, wherein when the first judgement device determines that no caller ID is received, the display device displays the date and time clocked by the clock device.

7. The communications terminal equipment according to claim 4 further including:

a caller information memory for previously storing a caller name and caller identification information corresponding to the caller name; and a first judgement device for determining whether or not a caller name corresponding to the identification information detected by the detection device is stored in the caller information memory;

wherein when the first judgement device determines that the caller name is stored in the caller information memory, the display device displays the caller name together with the identification information after completion of the facsimile function.

8. The communications terminal equipment according to claim 7, wherein the display device displays the date and time clocked by the clock device and the elapsed time measured by the time measuring device.

9. The communications terminal equipment according to claim 8, wherein the display device displays the caller name, the date and time, and the elapsed time in an order of receipt through the communication circuit.

10. The communications terminal equipment according to claim 7, wherein the identification information is a caller telephone number included in the caller ID.

11. The communications terminal equipment according to claim 3, wherein the information device includes a print device for printing the identification information after completion of the execution of the facsimile function.

12. The communication terminal equipment according to claim 11, further including:

a caller information memory for previously storing a caller name and caller identification information corresponding to the caller name; and a first judgment device for determining whether or not a caller name corresponding to the identification information detected by the detection device is stored in the caller information memory;

wherein when the first judgment device determines that the caller name is stored in the caller information memory, the print device prints out the caller name together with the identification information.

13. The communications terminal equipment according to claim 12, wherein the print device prints out the caller name, the date and time clocked by the clock device, and the elapsed time measured by the time measuring device.

14. The communications terminal equipment according to claim 13, wherein the print device prints out the caller name, the date and time, and the elapsed time in an order of receipt through the communication circuit.

15. The communications terminal equipment according to claim 11, wherein the identification information is a caller telephone number included in the caller ID.

16. The communications terminal equipment according to claim 1 further including:
an identification information selection device for selecting a predetermined one of the identification information stored in the identification information memory; and
a redial function for making a redial to a party identified by the identification information selected by the identification information selection device.

17. A facsimile device capable of conducting communications through a communication circuit, the device comprising:
a detection device for detecting caller identification information of an external communications terminal device which makes an incoming call to the facsimile device while the facsimile device is engaged in a previously initiated facsimile communication with another external communications terminal device;
an identification information memory for storing identification information detected by the detection device; and
an information device for informing a user of the stored identification information.

18. The communications terminal equipment according to the claim 17 further including:
a clock device for clocking date and time; and
a receipt date and time detection device for detecting receipt date and time of the caller ID from the clock device and storing the receipt date and time in correspondence with the identification information in the identification information memory;
wherein the information device informs the identification information together with the receipt date and time corresponding to the identification information.

19. The communications terminal equipment according to claim 18 further including:
a time measuring device for measuring an elapsed time from a time when the caller ID is received;
wherein the information device informs the identification information together with the elapsed time from the receipt of the identification information.

* * * * *